US007005960B2

(12) United States Patent
Flick

(10) Patent No.: US 7,005,960 B2
(45) Date of Patent: Feb. 28, 2006

(54) VEHICLE REMOTE CONTROL SYSTEM WITH SELECTABLE OUTPUTS AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 354 days.

(21) Appl. No.: 10/171,359

(22) Filed: Jun. 13, 2002

(65) Prior Publication Data

US 2003/0231101 A1    Dec. 18, 2003

(51) Int. Cl.
```
B60R 25/00     (2006.01)
G05B 19/00     (2006.01)
G06F 7/00      (2006.01)
G08B 29/00     (2006.01)
H04B 1/00      (2006.01)
```
(52) U.S. Cl. .................. 340/5.72; 340/5.62; 340/5.22
(58) Field of Classification Search .............. 340/5.72, 340/5.62, 5.63, 5.22, 5.23, 5.24, 426; 455/404.1
See application file for complete search history.

(56) References Cited

U.S. PATENT DOCUMENTS

| | | | | |
|---|---|---|---|---|
| 4,670,746 A | | 6/1987 | Taniguchi et al. ...... | 340/825.31 |
| 4,672,375 A | | 6/1987 | Mochida et al. ....... | 340/825.31 |
| 4,688,036 A | | 8/1987 | Hirano et al. .......... | 340/825.69 |
| 5,146,215 A | * | 9/1992 | Drori ....................... | 340/5.22 |
| 5,568,120 A | * | 10/1996 | LeMense et al. ...... | 340/426.28 |
| 5,850,173 A | | 12/1998 | DiCroce et al. ........... | 340/426 |
| 5,850,174 A | * | 12/1998 | DiCroce et al. ....... | 340/426.28 |
| 6,144,315 A | * | 11/2000 | Flick ..................... | 340/825.69 |
| 6,449,472 B1 | * | 9/2002 | Dixit et al. .............. | 455/404.1 |
| 6,542,071 B1 | * | 4/2003 | Ohtsubo et al. ....... | 340/426.28 |
| 6,567,012 B1 | * | 5/2003 | Matsubara et al. .... | 340/825.72 |
| 6,587,052 B1 | * | 7/2003 | Flick ..................... | 340/825.69 |

* cited by examiner

*Primary Examiner*—Michael Horabik
*Assistant Examiner*—Nam Nguyen
(74) *Attorney, Agent, or Firm*—Allen, Dyer, Doppelt, Milbrath & Gilchrist, P.A.

(57) ABSTRACT

A vehicle remote control system includes a remote transmitter to be carried by a user for selectively transmitting signals, and a controller for receiving the signals. The controller includes outputs and is switchable between first and second output operating states. In the first output operating state, the controller operates a first output based upon a first occurrence of receiving a first signal from the remote transmitter, and operates a second output based upon a second occurrence of receiving the first signal from the remote transmitter within a predetermined time of the first occurrence thereof. In the second output operating state, the controller operates the first output based upon the first occurrence of receiving the first signal from the remote transmitter, does not operate the second output based upon the second occurrence of receiving the first signal from the remote transmitter within the predetermined time of the first occurrence thereof, and, instead, operates the second output based upon receiving a second signal from remote transmitter.

25 Claims, 6 Drawing Sheets

VEHICLE REMOTE CONTROL SYSTEM WITH SELECTABLE OUTPUTS AND ASSOCIATED METHODS

FIELD OF THE INVENTION

The present invention relates to the field of remote control systems, and, more particularly, to a remote control system having enhanced output options for installation in a vehicle, and associated methods.

BACKGROUND OF THE INVENTION

Vehicle security systems are widely used to deter vehicle theft and perform various security-related vehicle functions. A typical vehicle security system includes a controller having a receiver connected thereto. The controller may perform security-related functions, such as locking/unlocking doors, or switching between armed and disarmed modes responsive to signals received from one or more remote transmitters. When in the armed mode, the controller may generate an alarm indication at the vehicle responsive to a vehicle security sensor indicating a vehicle security breach. The remote transmitters are typically carried by the owner of the vehicle.

Some vehicles are equipped with remote keyless entry (RKE) features to permit a user to remotely lock and unlock the vehicle doors using a small handheld transmitter. One class of RKE arrangements provides a driver door priority unlock feature. The driver door priority unlock feature operates as follows. The user presses a door unlock button on the handheld transmitter to send a first signal to a receiver at the vehicle. In response, a first controller output is operated which causes only the driver's door to unlock. If the user wishes to unlock all of the vehicle doors, the same unlock button is pressed a second time and within a predetermined time of its first pressing. The receiver causes a second control output to operate which thereby unlocks all of the vehicle doors. U.S. Pat. No. 5,850,173 to DiCroce et al., for example, discloses such a vehicle RKE arrangement with the driver door priority unlock feature.

Other vehicles include a more basic RKE arrangement whereby all of the vehicle doors are unlocked based upon receiving an unlock signal from the remote transmitter. For these vehicles, only a single output is used to unlock all of the vehicle doors.

It is quite common to upgrade RKE factory installed equipment with an aftermarket security system to provide additional security features. A typical aftermarket vehicle security system includes two outputs and control circuitry to be compatible with the two-output driver door priority unlock RKE equipment described above. Of course, such an aftermarket vehicle security system will also be compatible with the basic RKE equipment which only unlocks all of the vehicle doors. The second output, however, will remain unused when the aftermarket security system is installed with basic RKE equipment. It is often desired to perform a number of remote control functions to enhance the user's convenience. Accordingly, it is somewhat inefficient to have the second output remain unused.

SUMMARY OF THE INVENTION

In view of the foregoing background, it is therefore an object of the present invention to provide an efficient and more convenient vehicle remote control system.

This and other objects, features, and advantages of the present invention are provided by a vehicle remote control system comprising a remote transmitter to be carried by a user that may be used for selectively transmitting a plurality of signals. The vehicle remote control system may further include a controller for receiving the signals from the remote transmitter. The controller may comprise a plurality of outputs and may be switchable between first and second output operating states.

In the first output operating state, the controller may operate a first output based upon a first occurrence of receiving a first signal from the remote transmitter. The controller may further operate a second output based upon a second occurrence of receiving the first signal from the remote transmitter within a predetermined time of the first occurrence thereof. For example, this is the typical operation to be compatible with the driver door priority feature.

In the second output operating state, the controller may operate the first output based upon the first occurrence of receiving the first signal from the remote transmitter. However, the controller does not operate the second output based upon the second occurrence of receiving the first signal from the remote transmitter within the predetermined time of the first occurrence thereof. The controller may, however, operate the second output based upon receiving a second signal from the remote transmitter.

The first signal from the remote transmitter may be a door unlocking signal. When in the first output operating state, the controller may unlock a driver's door based upon the first occurrence of receiving the door unlocking signal, and unlock all vehicle doors based upon the second occurrence of receiving the door unlocking signal within the predetermined time.

The second signal from the remote transmitter may be a vehicle engine starting signal, a vehicle window operation signal, or a vehicle trunk opening signal, for example.

When in the first output operating state the controller may operate the first output based upon the second occurrence of receiving the first signal from the remote transmitter within the predetermined time of the first occurrence thereof. The remote transmitter may comprise a housing, first and second user operable switches carried by the housing, and circuitry for transmitting the first signal based upon user operation of the first switch and for transmitting the second signal based upon user operation of the second switch.

The controller may be switchable to a feature programming mode permitting switching to the first or second output operating state. The controller may further comprise a receiver, and a processor connected to the receiver and to the outputs.

A method aspect of the invention is directed to a vehicle remote control method. The method may include providing at least one remote transmitter to be carried by a user for selectively transmitting a plurality of signals and switching a controller for receiving the plurality of signals from the remote transmitter between a first and second output operating state. When in the first output operating state, the method may also include operating a first output based upon a first occurrence of receiving a first signal from the remote transmitter, and operating a second output based upon a second occurrence of receiving the first signal from the remote transmitter within a predetermined time of the first occurrence thereof. When in the second output operating state, the method may further include operating the first output based upon the first occurrence of receiving the first signal from the remote transmitter, not operating the second output based upon the second occurrence of receiving the first signal from the remote transmitter within the predetermined time of the first occurrence thereof, and operating the second output based upon receiving a second signal from the remote transmitter.

DETAILED DESCRIPTION OF THE PREFERRED EMBODIMENTS

Figure 1:
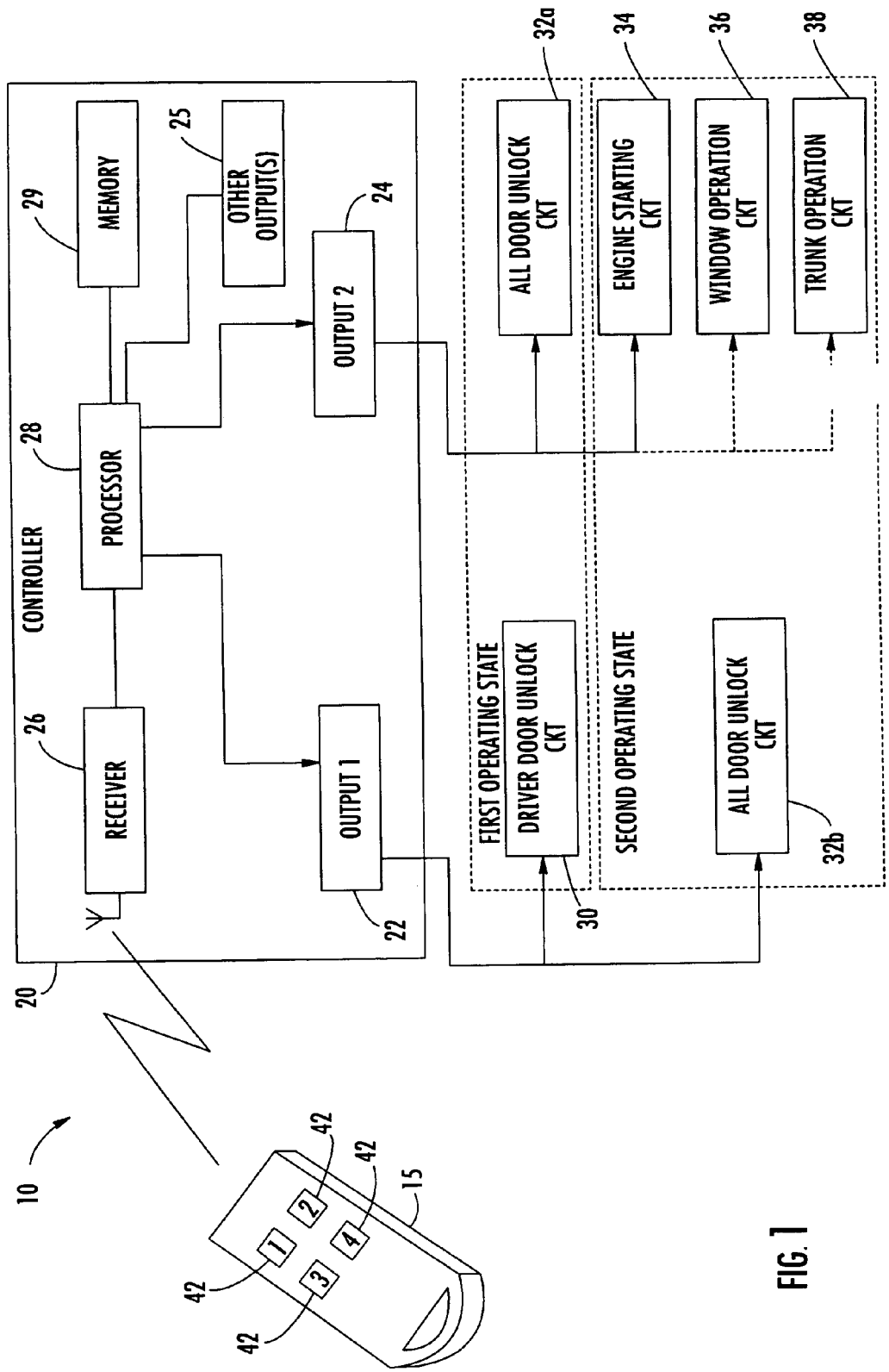
FIG. 1 is a schematic block diagram of the vehicle remote control system according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1–4, a vehicle remote control system 10 is now described. The vehicle remote control system 10 illustratively includes at least one remote transmitter 15 to be carried by a user for selectively transmitting a plurality of signals. The vehicle remote control system 10 also illustratively includes a controller 20 for receiving the signals from the remote transmitter 15. The controller 20 illustratively includes a first output 22, a second output 24, and, optionally one or more additional outputs 25 and is switchable between first and second output operating states.

The controller 20 also illustratively includes a receiver 26 for receiving the wireless signals transmitted by the remote transmitter 15, a processor 28 connected to the receiver for processing the received signals, and a memory 29 connected to the processor. The controller 20 is also preferably switchable to a feature programming mode to permit switching to the first or second output operating state.

Figure 2:
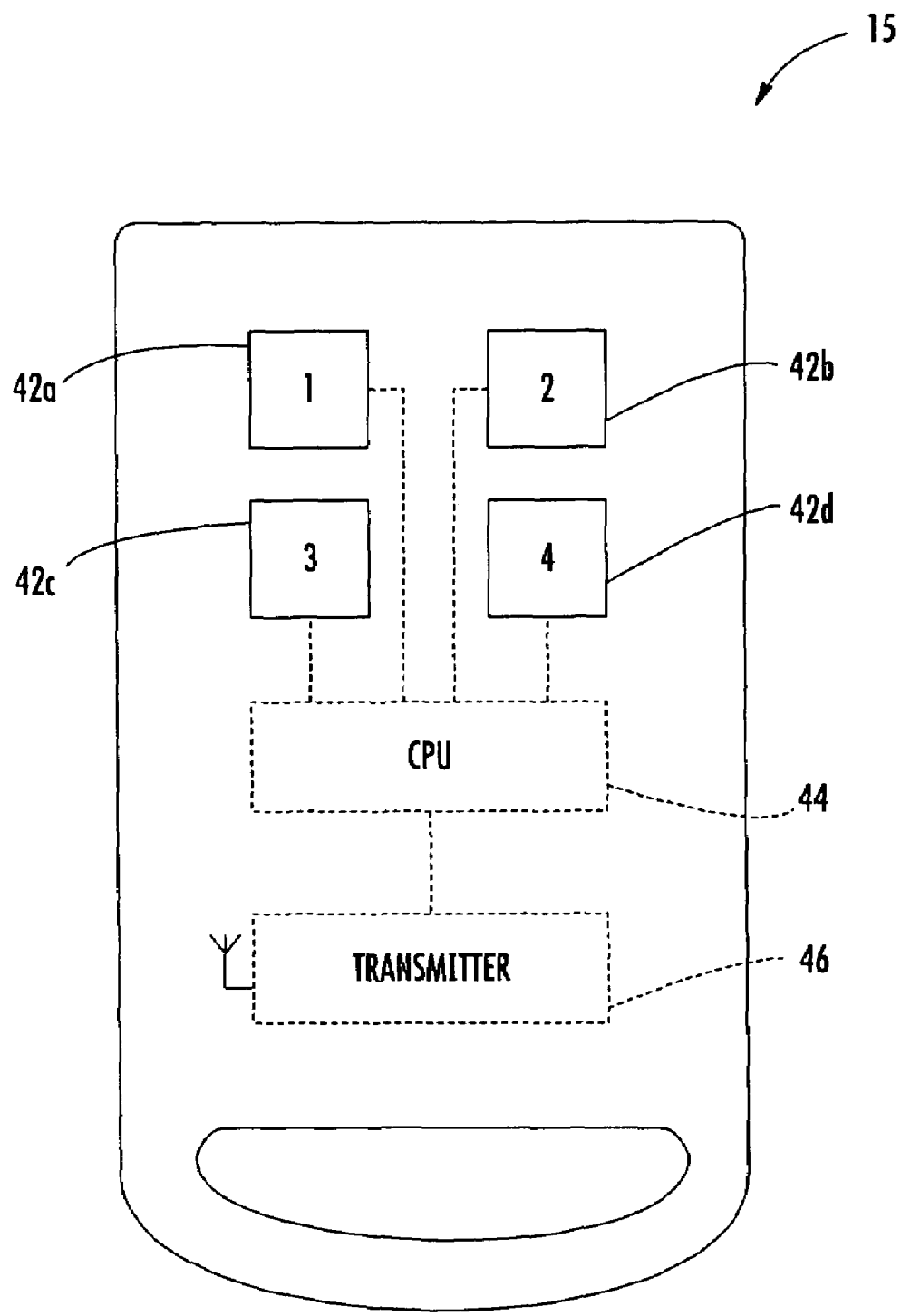
FIG. 2 is a schematic block diagram of the remote transmitter shown in FIG. 1.

As perhaps best illustrated in FIG. 2, the remote transmitter 15 illustratively includes a housing 40 and a plurality of user operable switches 42a–42d carried by the housing. The remote transmitter 15 also includes circuitry for transmitting signals based upon user operation of the user operable switches 42. The circuitry illustratively includes a processor 44 and a wireless transmitter 46 for transmitting respective signals based upon operation of the user operable switches 42a–42d.

Figure 3:
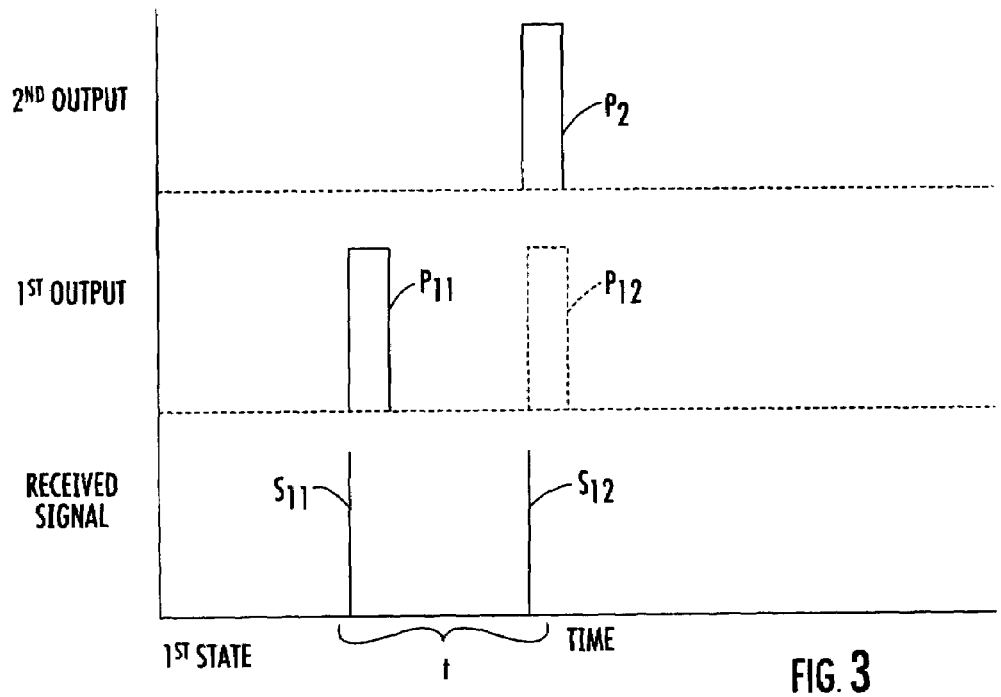
FIG. 3 is a graph of signals for the first output operating state of the vehicle remote control system shown in FIG. 1.

Referring more particularly to FIG. 3, when in the first output operating state, the controller 20 operates the first output 22 to generate a pulse $p_{11}$ based upon a first occurrence of the receiver 26 receiving a first signal $s_{11}$ from the remote transmitter 15. The controller 20 further operates the second output 24 to generate a pulse $p_2$ based upon a second occurrence of receiving the first signal $s_{12}$ from the remote transmitter 15 within a predetermined time t of the first occurrence thereof. The controller 20 may also optionally operate the first output 22 to generate another pulse $p_{12}$ based on the signal 22.

Figure 4:
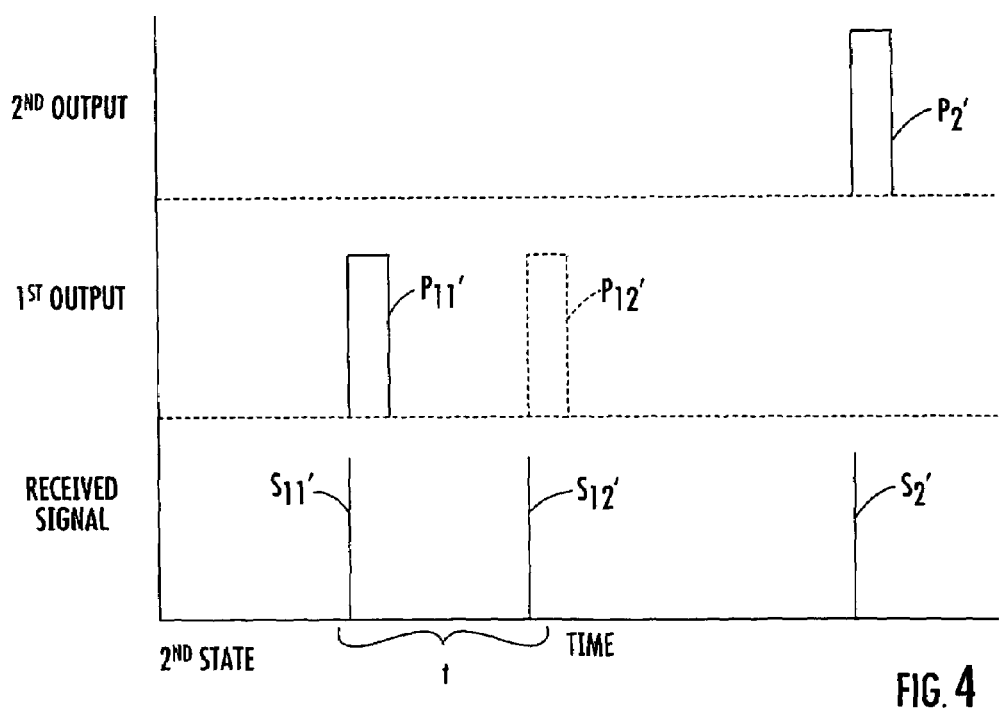
FIG. 4 is a graph of signals for the second output operating state of the vehicle remote control system shown in FIG. 1.

As perhaps best graphically illustrated in FIG. 4, when in the second output operating state, the controller 20 operates the first output 22 to generate a pulse $p_{11}'$ based upon the first occurrence of the receiver 26 receiving the first signal $s_{11}'$ from the remote transmitter 15. Unlike the first output operating state, the controller 20 in the second output operating state does not operate the second output 24 based upon the second occurrence of receiving the first signal $s_{12}''$ within the predetermined time. Rather, in some embodiments upon receiving the first signal a second time, the first output 22 is again operated to generate the pulse $p_{12}'$. The controller 20 illustratively operates the second output 24 to generate a pulse $p_2'$ upon receiving a second signal $s_2'$ from the remote transmitter 15. Although the second output 24 is graphically illustrated in time as being operated after the first output 22, those skilled in the art will appreciate that the first and second outputs are operated independent of time when the controller 20 is in the second output operating state.

As graphically illustrated, the second output 24 is operated in time after the first output. The first 22 and second 24 outputs may, however, be operated before independent of time. In other words, in some embodiments, the second output may be operated before the first output based upon receiving the second signal.

When in the first output operating state, the first signal from the remote transmitter 15 is illustratively for a driver door unlocking circuit 30. The second signal from the remote transmitter 15 is illustratively for an all door unlocking circuit 32a. Therefore, when in the first output operating state, when the controller 20 receives the first signal a first time, the driver door is unlocked. When the controller 20 receives the first signal a second time within a predetermined time, all vehicle doors are unlocked.

When in the second output operating state, the first signal from the remote transmitter 15 illustratively a door unlocking signal which operates the all door unlocking circuit 32b. The second signal from the remote transmitter 15 is illustratively one of an engine starting signal for the engine starting circuit 34, a window operation signal for the window operating circuit 36, or a vehicle trunk operation signal for the vehicle trunk circuit 38. Other vehicle functions may also be operated by the second signal, such as hood opening, alarm arming/disarming, or any other vehicle function as will be appreciated by those skilled in the art.

Figure 5:
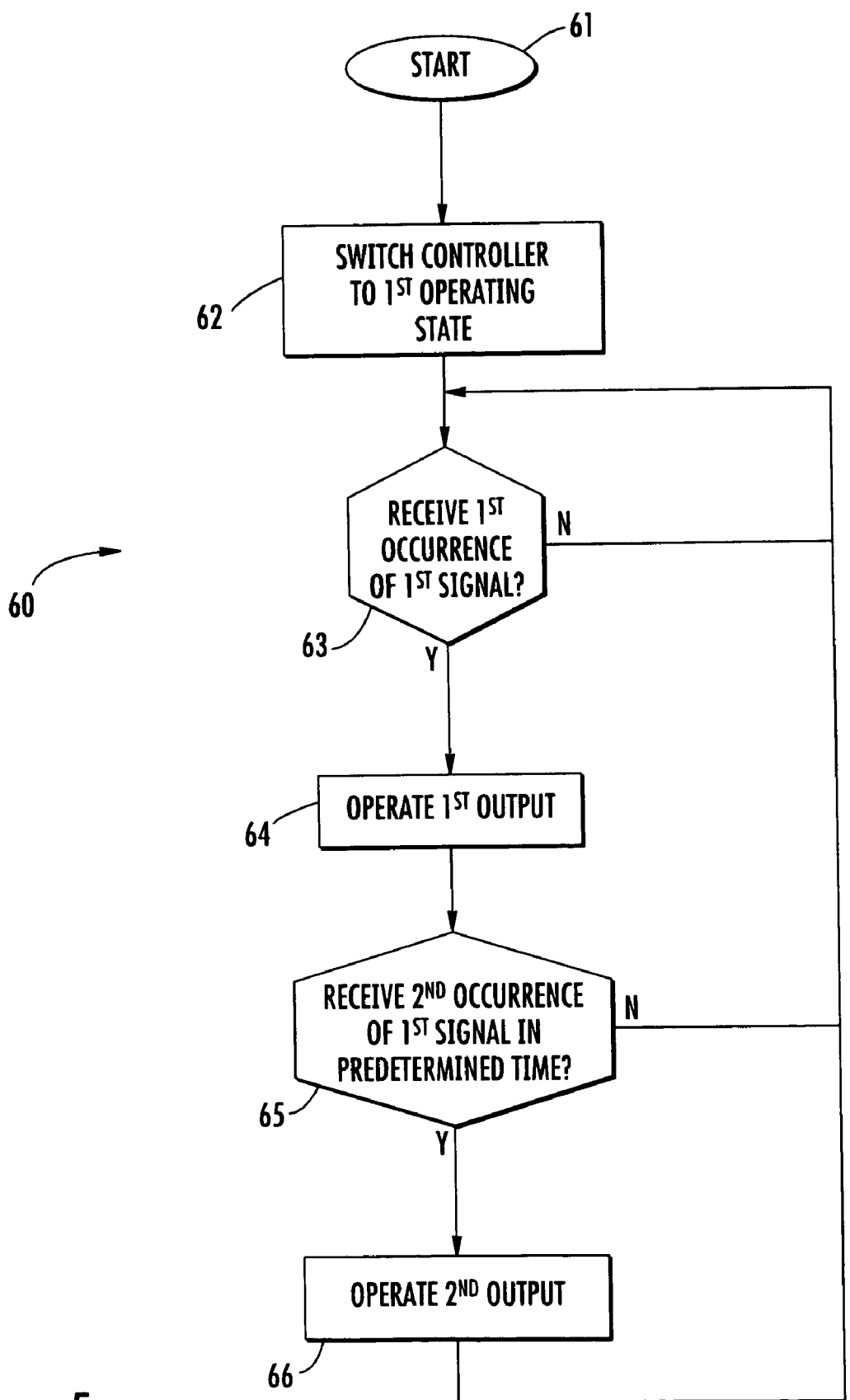
FIGS. 5–7 are flowcharts illustrating operation of the vehicle remote control system shown in FIG. 1.

Turning now additionally to the flowchart 60 of FIG. 5, a vehicle remote control method aspect is now described. From the start (Block 61) the controller 20 is switched to the first output operating state at Block 62. At Block 63 it is determined whether a first occurrence of the first signal has been received. If so, the first output 22 is operated at Block 64. At Block 65 it is determined whether a second occurrence of the first signal has been received within the predetermined time. If a second occurrence of the first signal is not received within the predetermined time, the controller 20 again awaits a first occurrence of the first signal at Block 63. If, however, the controller 20 receives a second occurrence of the first signal within the predetermined time, then the second output 24 is operated at Block 66.

Figure 6:
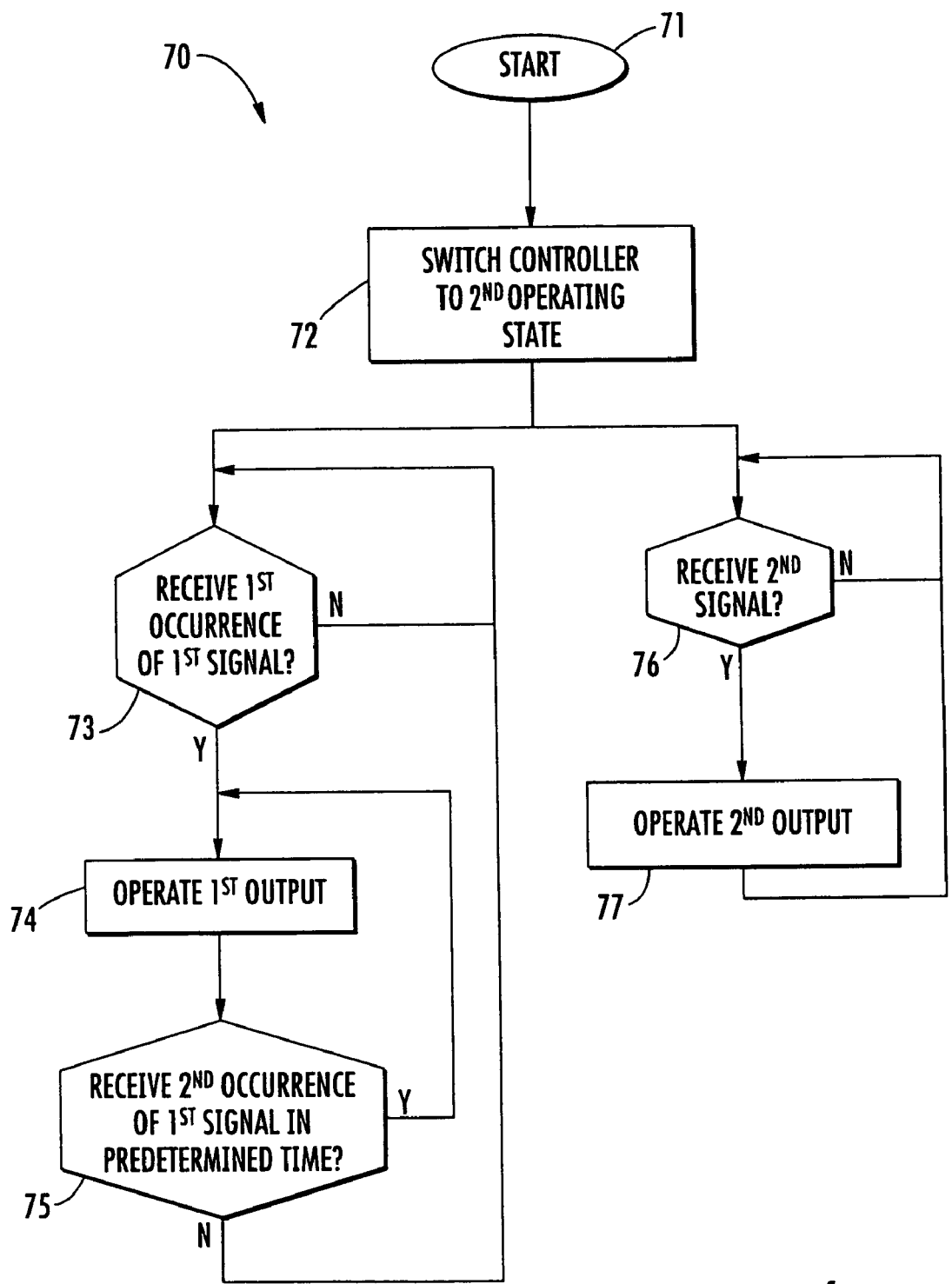

Turning now additionally to the flow chart 70 of FIG. 6, another vehicle remote control method aspect is now described. From the start (Block 71) the controller 20 is switched to the second output operating state. At Block 73 it is determined whether a first occurrence of the first signal has been received. If so, the first output 22 is operated at Block 74. At Block 75 it is determined whether a second occurrence of the first signal has been received within a predetermined time. If so, the first output 22 is again operated at Block 74. Turning now to the right side of the flow chart 70 of FIG. 6, at Block 76, it is determined whether the second signal has been received. If it is determined at Block 76 that the second signal has been received, then the second output 24 is operated at Block 77.

Figure 7:
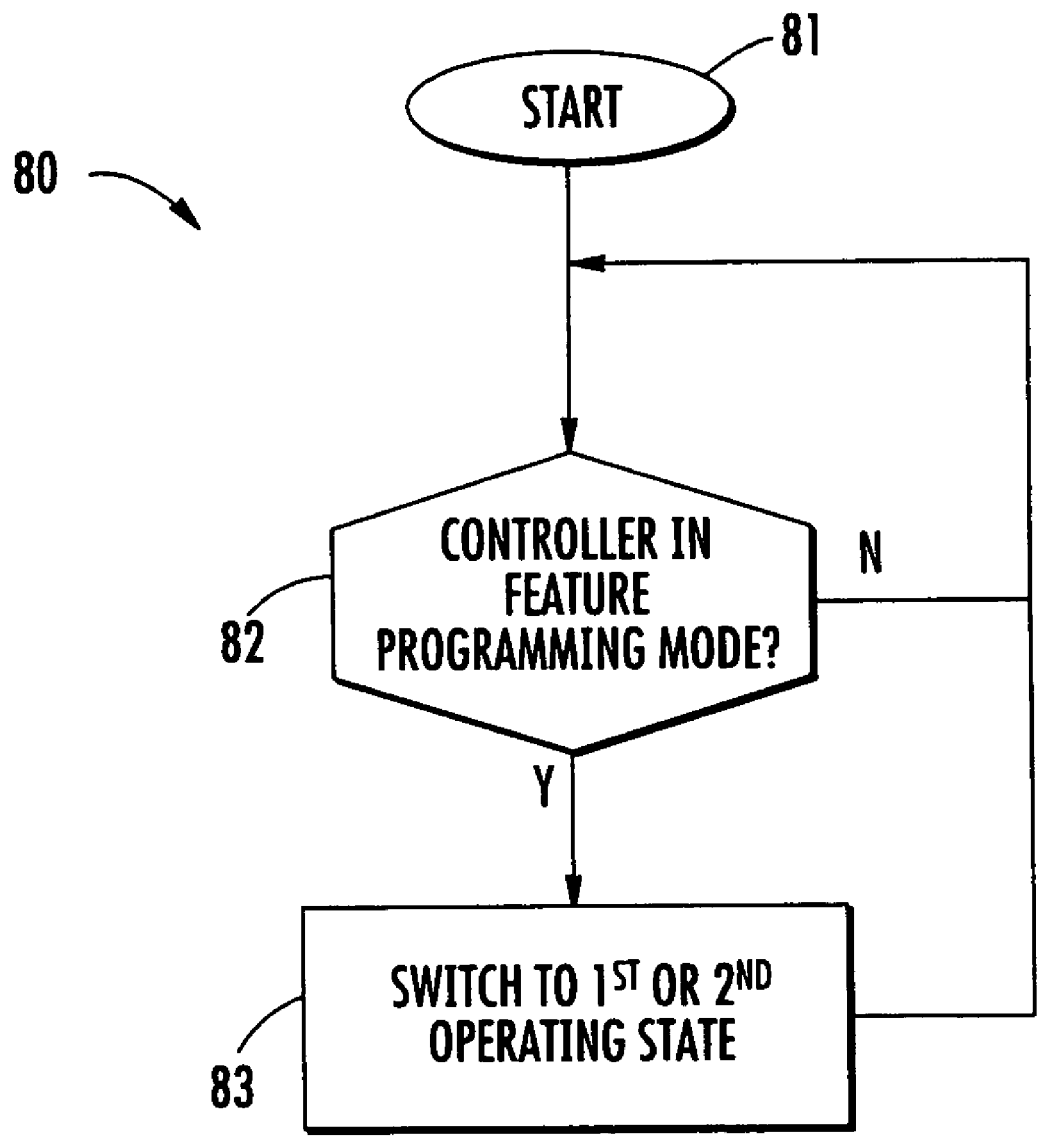

Turning now additionally to the flow chart 80 of FIG. 7, another vehicle remote control method aspect is now described. From the start (Block 81) it is determined at Block 82 whether the controller 20 is in the feature programming mode. If it is determined that the controller 20 is in the feature programming mode, then the controller is switched to either the first or second output operating states (Block 83).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle remote control system comprising:
    at least one remote transmitter to be carried by a user for selectively transmitting a plurality of signals; and
    a controller for receiving the signals from said at least one remote transmitter, said controller comprising a plurality of outputs and being switchable between first and second output operating states;
    said controller in the first output operating state operating a first output based upon a first occurrence of receiving a first signal from said at least one remote transmitter, and operating a second output based upon a second occurrence of receiving the first signal from said at least one remote transmitter within a predetermined time of the first occurrence thereof;
    said controller in the second output operating state operating the first output based upon the first occurrence of receiving the first signal from said at least one remote transmitter, not operating the second output based upon the second occurrence of receiving the first signal from said at least one remote transmitter within the predetermined time of the first occurrence thereof, and operating the second output based upon receiving a second signal from said at least one remote transmitter.

2. A vehicle remote control system according to claim 1 wherein the first signal from said at least one remote transmitter is a door unlocking signal.

3. A vehicle remote control system according to claim 2 wherein said controller, when in the first output operating state, unlocks a driver's door based upon the first occurrence of receiving the door unlocking signal and unlocks all vehicle doors based upon the second occurrence of receiving the door unlocking signal within the predetermined time.

4. A vehicle remote control system according to claim 1 wherein the second signal from said at least one remote transmitter is a vehicle engine starting signal.

5. A vehicle remote control system according to claim 1 wherein the second signal from said at least one remote transmitter is a vehicle window operation signal.

6. A vehicle remote control system according to claim 1 wherein the second signal from said at least one remote transmitter is a vehicle trunk opening signal.

7. A vehicle remote control system according to claim 1 wherein said controller when in the first output operating state also operates the first output based upon the second occurrence of receiving the first signal from said at least one remote transmitter within the predetermined time of the first occurrence thereof.

8. A vehicle remote control system according to claim 1 wherein said at least one remote transmitter comprises:
    a housing;
    first and second user operable switches carried by said housing; and
    circuitry for transmitting the first signal based upon user operation of the first switch and for transmitting the second signal based upon user operation of the second switch.

9. A vehicle remote control system according to claim 1 wherein the controller is switchable to a feature programming mode permitting switching to the first or second output operating state.

10. A vehicle remote control system according to claim 1 wherein said controller further comprises a receiver, and a processor connected to said receiver and to said outputs.

11. A vehicle remote control system comprising:
    at least one remote transmitter to be carried by a user for selectively transmitting a plurality of signals; and
    a controller for receiving the signals from said at least one remote transmitter, said controller comprising a plurality of outputs and being switchable between first and second output operating states;
    said controller in the first output operating state operating a first output to unlock a driver's door based upon a first occurrence of receiving a first signal from said at least one remote transmitter, and operating a second output to unlock all vehicle doors based upon a second occurrence of receiving the first signal from said at least one remote transmitter within a predetermined time of the first occurrence thereof;
    said controller in the second output operating state operating the first output to unlock all vehicle doors based upon the first occurrence of receiving the first signal from said at least one remote transmitter, not operating the second output based upon the second occurrence of receiving the first signal from said at least one remote transmitter within the predetermined time of the first occurrence thereof, and operating the second output to perform another function unrelated to door locking based upon receiving a second signal from said at least one remote transmitter.

12. A vehicle remote control system according to claim 11 wherein the other function is vehicle engine starting.

13. A vehicle remote control system according to claim 11 wherein the other function is vehicle window operation.

14. A vehicle remote control system according to claim 11 wherein the other function is vehicle trunk opening.

15. A vehicle remote control system according to claim 11 wherein said at least one remote transmitter comprises:
    a housing;
    first and second user operable switches carried by said housing; and
    circuitry for transmitting the first signal based upon user operation of the first switch and for transmitting the second signal based upon user operation of the second switch.

16. A vehicle remote control system according to claim 11 wherein the controller is switchable to a feature programming mode permitting switching to the first or second output operating state.

17. A vehicle remote control system according to claim 11 wherein said controller further comprises a receiver, and a processor connected to said receiver and to said outputs.

18. A vehicle remote control method comprising:
providing at least one remote transmitter to be carried by a user for selectively transmitting a plurality of signals;
switching a controller for receiving the plurality of signals from the at least one remote transmitter between a first and second output operating state;
when in the first output operating state, operating a first output based upon a first occurrence of receiving a first signal from the at least one remote transmitter, and operating a second output based upon a second occurrence of receiving the first signal from the at least one remote transmitter within a predetermined time of the first occurrence thereof; and
when in the second output operating state, operating the first output based upon the first occurrence of receiving the first signal from the at least one remote transmitter, not operating the second output based upon the second occurrence of receiving the first signal from the at least one remote transmitter within the predetermined time of the first occurrence thereof, and operating the second output based upon receiving a second signal from the at least one remote transmitter.

19. A method according to claim 18 wherein the first signal from the at least one remote transmitter is a door unlocking signal.

20. A method according to claim 19 further comprising unlocking a driver's door based upon the first occurrence of receiving the door unlocking signal and unlocking all vehicle doors based upon the second occurrence of receiving the door unlocking signal within the predetermined time when the controller is in the first output state.

21. A method according to claim 18 wherein the second signal from the at least one remote transmitter is a vehicle engine starting signal.

22. A method according to claim 18 wherein the second signal from the at least one remote transmitter is a vehicle window operation signal.

23. A method according to claim 18 wherein the second signal from the at least one remote transmitter is a vehicle trunk opening signal.

24. A method according to claim 18 further comprising operating the first output based upon the second occurrence of receiving the first signal from the at least one remote transmitter within the predetermined time of the first occurrence thereof when the controller is in the first operating state.

25. A method according to claim 18 wherein the controller is switchable to a feature programming mode permitting switching to the first or second output operating state.

* * * * *

UNITED STATES PATENT AND TRADEMARK OFFICE
Certificate

Patent No. 7,005,960 B2                                              Patented: February 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kenneth E. Flick, Douglasville, GA (US); and Robert Loyd Drew, Bowdon, GA (US).

Signed and Sealed this Twentieth Day of June 2006.

WENDY GARBER
*Supervisory Patent Examiner*
Art Unit 2612